(12) United States Patent
Berstad

(10) Patent No.: US 8,050,139 B2
(45) Date of Patent: Nov. 1, 2011

(54) SYSTEM AND METHOD FOR TOWING ACOUSTIC SOURCE ARRAYS

(75) Inventor: Are Johan Berstad, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 449 days.

(21) Appl. No.: 12/413,384

(22) Filed: Mar. 27, 2009

(65) Prior Publication Data

US 2010/0246323 A1 Sep. 30, 2010

(51) Int. Cl.
*G01V 1/38* (2006.01)

(52) U.S. Cl. .......................... 367/16; 367/153; 114/253

(58) Field of Classification Search .................. 367/15, 367/16, 141, 153, 165; 181/111; 114/244, 114/253
See application file for complete search history.

(56) References Cited

U.S. PATENT DOCUMENTS

| | | |
|---|---|---|
| 3,840,845 A | 10/1974 | Brown |
| 3,952,281 A | 4/1976 | Parrack |
| 4,648,082 A | 3/1987 | Savit |
| 4,686,660 A | 8/1987 | Gjestrum et al. |
| 4,693,336 A | 9/1987 | Newman |
| 4,721,180 A | 1/1988 | Haughland et al. |
| 4,935,903 A | 6/1990 | Sanders et al. |
| 4,937,793 A | 6/1990 | Shuck et al. |
| 4,958,328 A | 9/1990 | Stubblefield |
| 4,970,697 A | 11/1990 | Earley et al. |
| 4,992,991 A | 2/1991 | Young et al. |
| 5,046,057 A | 9/1991 | Berni |
| 5,113,377 A | 5/1992 | Johnson |
| 5,148,406 A | 9/1992 | Brink et al. |
| 5,469,404 A * | 11/1995 | Barber et al. .................. 367/23 |
| 5,517,463 A | 5/1996 | Hornbostel et al. |
| 5,973,995 A | 10/1999 | Walker et al. |
| 6,028,817 A | 2/2000 | Ambs |
| 6,088,299 A | 7/2000 | Erath et al. |
| 6,256,090 B1 | 7/2001 | Chen et al. |
| 6,256,589 B1 | 7/2001 | Gallotti et al. |
| 6,327,537 B1 | 12/2001 | Ikelle |
| 6,477,470 B2 | 11/2002 | Fokkema et al. |
| 6,493,636 B1 | 12/2002 | Dekok |
| 6,529,445 B1 | 3/2003 | Laws |
| 6,618,321 B2 | 9/2003 | Brunet |
| 6,654,694 B2 | 11/2003 | Fokkema et al. |
| 6,691,038 B2 | 2/2004 | Zajac |
| 6,694,909 B1 | 2/2004 | Cipolla et al. |
| 6,747,913 B2 | 6/2004 | Fokkema et al. |
| 6,775,618 B1 | 8/2004 | Robertsson et al. |
| 6,961,284 B2 | 11/2005 | Moldoveanu |
| 7,047,898 B2 | 5/2006 | Petersen et al. |
| 2006/0176775 A1 | 8/2006 | Toennessen |
| 2008/0022913 A1 | 1/2008 | Toennessen et al. |
| 2009/0050044 A1 | 2/2009 | Stokkeland et al. |

OTHER PUBLICATIONS

PCT Search Report, dated Oct. 4, 2010, Application No. PCT/US2010/028485.

* cited by examiner

*Primary Examiner* — Jack Keith
*Assistant Examiner* — Krystine Breier

(57) ABSTRACT

A technique facilitates the production of acoustic pulses used in marine seismic surveys. A source array system comprises a plurality of acoustic sources suspended from a float in a plurality of layers positioned at different vertical levels. A bridle is coupled to the plurality of layers to enable towing of the source array system. The bridle is constructed and connected in a manner such that the arrangement of acoustic sources substantially retains its nominal shape during towing.

23 Claims, 3 Drawing Sheets

SYSTEM AND METHOD FOR TOWING ACOUSTIC SOURCE ARRAYS

BACKGROUND

In a variety of marine environments, seismic surveys are conducted to gain a better understanding of geological formations beneath a body of water. Relatively large marine regions can be surveyed by a surface vessel or vessels towing seismic streamer cables through the water. Another vessel, or the same vessel, can be employed in providing seismic sources, such as compressed air guns utilized to generate acoustic pulses in the water. The seismic sources can be arranged in source arrays. In some applications, for example, air guns are suspended from a float and towed behind a seismic vessel. During towing, however, drag forces on the source array deform the shape of the array which can be detrimental to obtaining accurate seismic data.

Currently, a common technique for creating seismic source arrays is to position all the guns at one layer and to suspend the guns from a float. A tow rope extending from the towing vessel is coupled directly to the gun array. In other applications, the tow rope is connected directly to the float or float layer. In either application, the source array deforms substantially during towing.

Attempts also have been made to construct source arrays with the guns arranged in layers separated vertically. However, the towing of multilayered gun arrays tends to be far more complex than towing a single gun layer. Depending on how towing ropes and distance ropes are arranged, the shape of the source array can be severely distorted during towing relative to its nominal position. The towing shape is substantially altered due to the drag forces exerted by the water against the source array.

SUMMARY

In general, the present invention provides a methodology and system for the production of acoustic pulses used in marine seismic surveys. Generally, a source array system is created by a plurality of acoustic sources suspended from a float in a plurality of layers positioned at different vertical levels. The source array system comprises a bridle coupled to the plurality of layers to enable towing of the source array system by a suitable tow line. The bridle is constructed and connected in a manner such that the arrangement of acoustic sources substantially retains a desired shape during towing.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique for improving the production of acoustic pulses used in marine seismic surveys. The technique enables retention of a desired shape of a towed configuration, such as retention of the nominal shape of a towed source array with separated vertical layers of acoustic sources. A bridle is connected to the layers of acoustic sources in a manner that facilitates retention of the desired shape of the source array when towed.

In many applications, the towed configuration comprises a gun array with two vertically separated layers. The present technique enables the system to be towed at varying towing velocities while retaining the desired shape of the source array. The tow line is connected to the gun array by the bridle which connects to the individual layers of acoustic sources at the front of one or more gun arrays.

Figure 1:
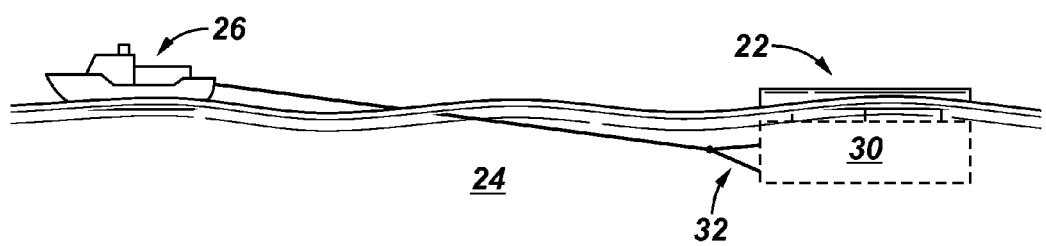
FIG. 1 is a schematic view of a seismic vessel pulling a source array system in a marine survey area, according to an embodiment of the present invention.

Referring generally to FIG. 1, an example of a seismic survey system 20 is illustrated according to one embodiment of the present invention. As illustrated, system 20 comprises an acoustic source array system 22 that is towed through a marine seismic survey area 24 to conduct a marine seismic survey. The acoustic source array system 22 may be towed by a surface vessel 26 connected to acoustic source array system 22 via a tow line 28. In this example, the acoustic source array system 22 comprises one or more acoustic source arrays 30 connected to tow line 28 by one or more corresponding bridles 32.

Figure 2:
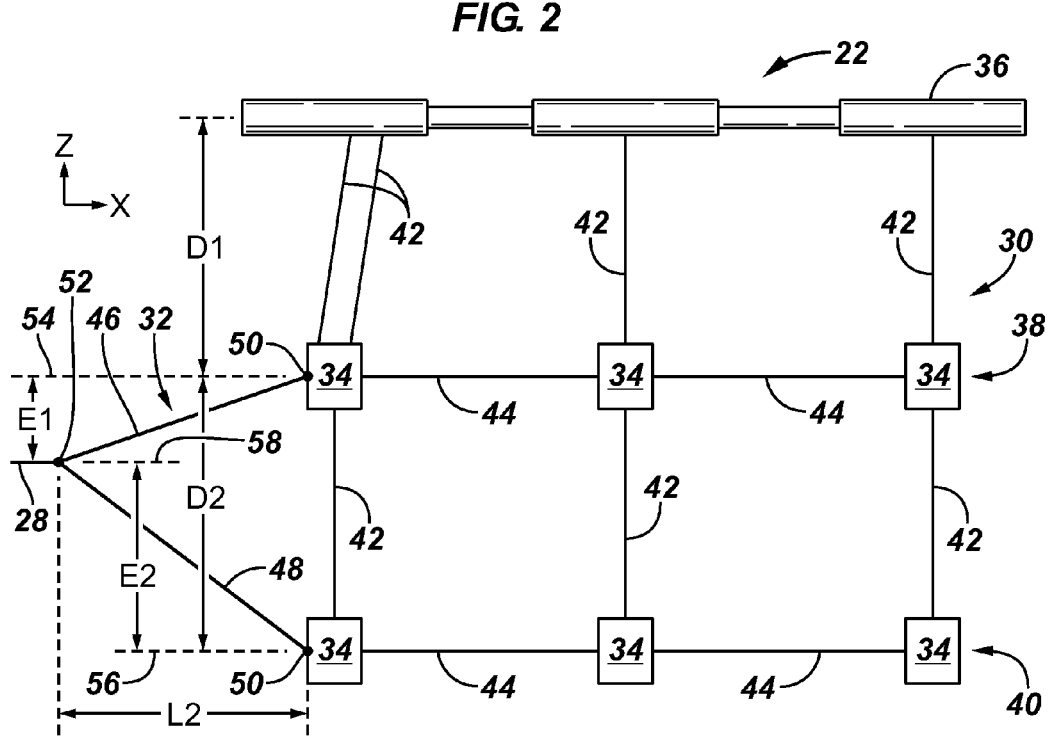
FIG. 2 is a schematic view of an example of a source array system, according to an embodiment of the present invention.

One example of acoustic source array system 22 is illustrated in FIG. 2. In the embodiment illustrated, the acoustic source array 30 comprises a plurality of acoustic sources 34 suspended below a float 36 designed to float along the surface of the water during towing by surface vessel 26. By way of example, the acoustic sources 34 may comprise acoustic guns, such as air guns operated to provide acoustic pulses. The acoustic sources 34 are arranged in a plurality of layers that are separated vertically. For example, the acoustic sources 34 may be arranged in a first layer 38 located above a second layer 40.

The first layer 38 of acoustic sources 34 may be suspended from float 36 by generally upright lines 42 that may be formed from suitable ropes, cables, or other types of suspension lines. The generally upright lines 42 can be individual lines or groups of lines connected between float 36 and the acoustic sources 34 of first layer 38. The second layer 40 of acoustic sources 34 also may be suspended from float 36 by generally upright lines 42. For example, the second layer 40 may be suspended by lines 42 that are connected between the acoustic sources 34 of first layer 38 and the acoustic sources 34 of second layer 40. Additionally, the acoustic sources 34 of each layer 38, 40 can be connected by generally horizontal/distance lines 44. Similar to upright lines 42, the generally horizontal lines 44 may comprise flexible lines formed of suitable ropes, cables, or other types of appropriate connector lines. The generally horizontal lines 44 can be positioned to horizontally align acoustic sources 34 of the upper layer 38 and to horizontally align acoustic sources 34 of the lower layer 40.

In the embodiment illustrated, bridle 32 is connected to first layer 38 and to second layer 40 by a first bridle line 46 and a second bridle line 48, respectively. Bridle lines 46, 48 can be formed as flexible lines of suitable rope, cable, or other lines able to withstand the towing forces. The bridle lines 46, 48 have connection ends 50 by which the bridle 32 is connected to a forward (or front) end of acoustic source array 30. For example, connection ends 50 can be coupled to the leading acoustic source 34 of each acoustic source layer 38, 40. The opposite ends of bridle lines 46, 48 are connected together at a tow connection end 52 which, in turn, is coupled to tow line 28.

The arrangement of bridle 32 can be described with reference to a coordinate system in which a z-axis is the vertical axis and an x-axis is a horizontal axis that extends back along the length of acoustic source array 30. As illustrated, the layers 38 and 40 lie at different vertical levels along the z-axis. For example, first layer 38 is located at a first vertical level 54 disposed below float 36, and second layer 40 is located at a second vertical level 56 below the first vertical level. The distance between float 36 and first layer 38 is a non-zero value that can be defined as D1, and the distance between first layer 38 and second layer 40 is a non-zero value that can be defined as D2. The connection ends 50 of bridle 32 are joined to the acoustic source array 30 at the vertical levels 54 and 56.

The tow connection end 52 of bridle 32 is disposed ahead of acoustic source array 30 by a non-zero distance, defined as L2, along the x-axis. Additionally, the tow connection end 52 is located at a vertical level 58 below the first vertical level 54 and above the second vertical level 56. In other words, the lengths of first bridle line 46 and second bridle line 48 are selected such that upon towing of acoustic source array 30, the tow connection end 52 automatically moves to the desired vertical level 58 between the vertical levels of first layer 38 and second layer 40. Consequently, the end of tow line 28 connected to bridle 32 also moves to the desired vertical level 58. The vertical distance between first vertical level 54 and vertical level 58 of tow connection end 52 can be defined as E1. Similarly, the vertical distance between second vertical level 56 and vertical level 58 of tow connection end 52 can be defined as E2. The vertical distances to tow connection end 52 establish the equation: $E1+E2=D2$. Additionally, the position of second layer 40 along the z-axis is less than the z-axis position of tow connection end 52 which is less than the z-axis position of first layer 38.

The arrangement of bridle 32 ensures that acoustic source array 30 retains its desired, e.g. nominal, shape while being towed by surface vessel 26. The coupling of connection ends 50 to first layer 38 and second layer 40, respectively, while joining the opposite ends of the bridle lines generally at a common point (located at the vertical and horizontal positions described above) prevents disruption of acoustic source array shape during towing and operation of the acoustic source array. As a result, more accurate data can be obtained during marine seismic surveys.

Figure 3:
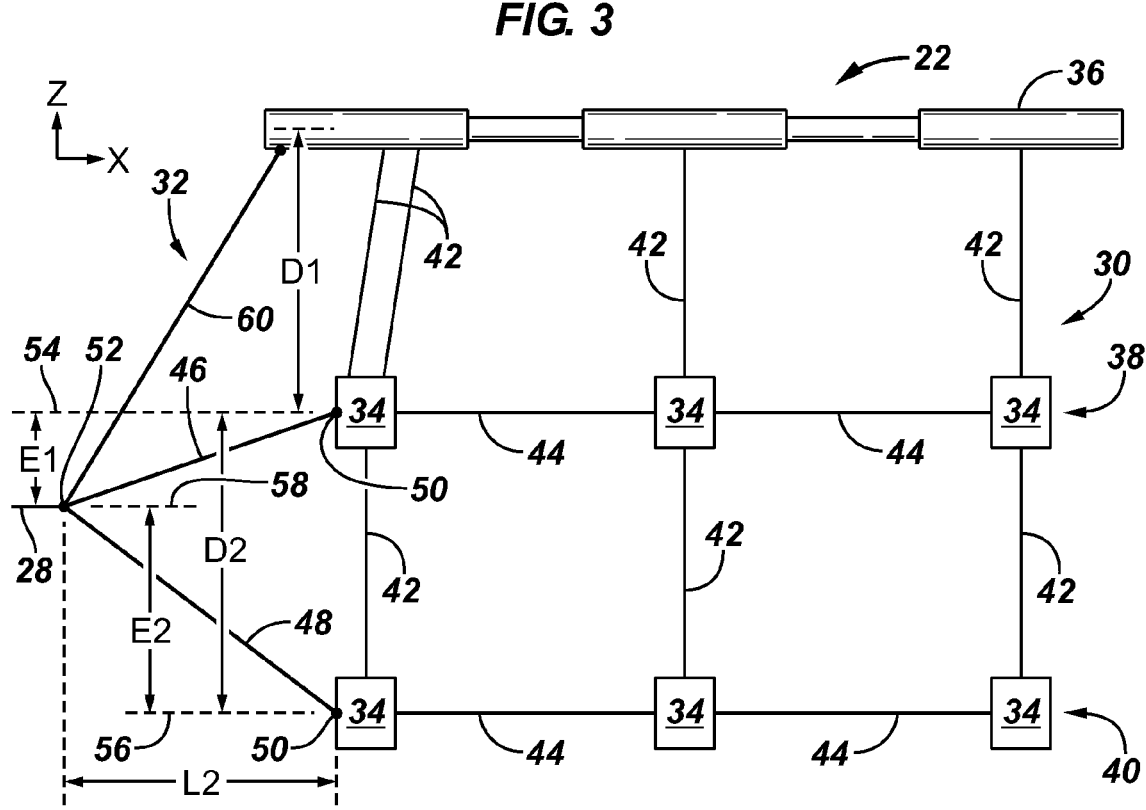
FIG. 3 is a schematic view of another example of a source array system, according to an alternate embodiment of the present invention.

Referring generally to FIG. 3, another embodiment of acoustic source array system 22 is illustrated. In this embodiment, an optional third bridle line 60 is connected between tow connection end 52 and float 36 of the surface float layer. In some applications, towing of the acoustic source array 30 is facilitated by applying a portion of the towing force to float 36 from a tow point located between the vertical level 54 of first layer 38 and the vertical level 56 of second layer 40.

The type of components utilized and the overall structure of acoustic source array system 22 may be varied from one seismic survey application to another. For example, the number of acoustic sources 34 in each layer 38, 40 can vary, and the structure, size, and type of acoustic sources can be selected according to the parameters of a given application. For example, the acoustic sources 34 may comprise air guns that are arranged individually or in clusters. As illustrated in the embodiment of FIG. 4, for example, the acoustic sources 34 are in the form of guns and each acoustic source 34 comprises a gun cluster 62 having a plurality of cooperating guns 64.

Figure 4:
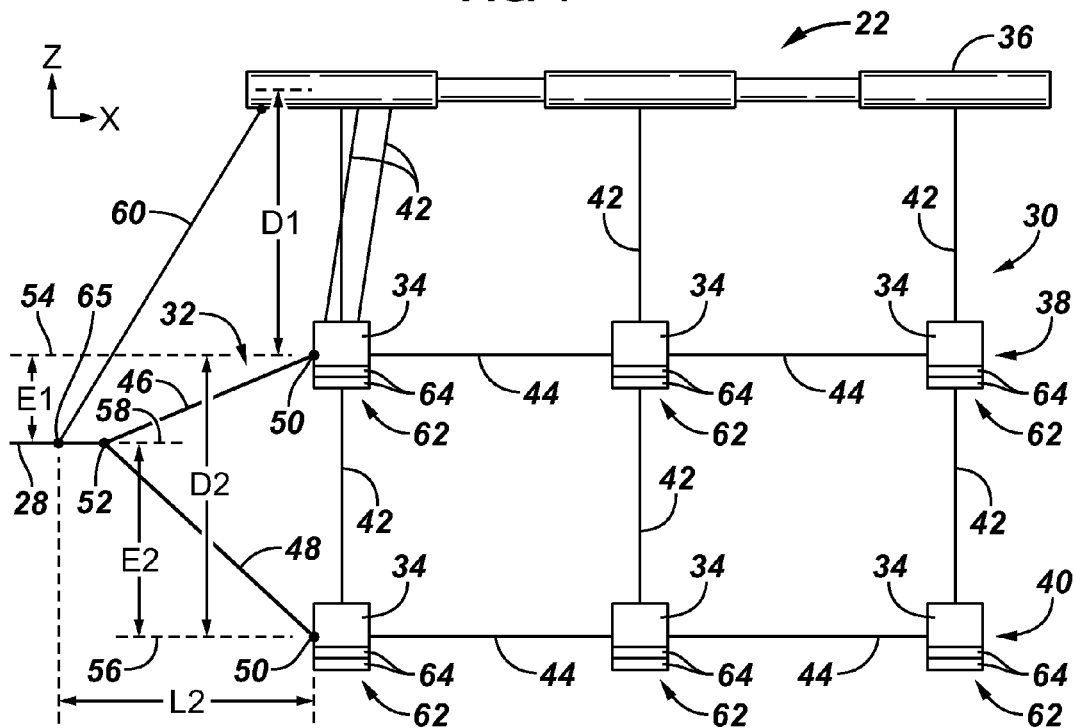
FIG. 4 is a schematic view of another example of a source array system, according to an alternate embodiment of the present invention.

With further reference to FIG. 4, additional variations are illustrated. For example, the bridle lines can be connected to tow line 28 at sequential points along the tow line. In the illustrated example, the bridle line 60 that extends to float 36 is connected to tow line 28 at a position 65 ahead of the location at which bridle lines 46 and 48 are joined via tow line 28. In another variation, the lower layer 40 of acoustic sources 34 is suspended directly from float 36 by independent lines 42, as illustrated, rather than being suspended from float 36 by attaching lines 42 to the acoustic sources of upper layer 38.

Figure 5:
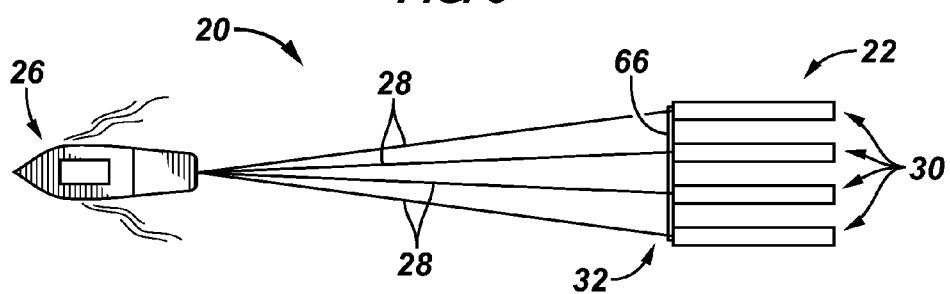
FIG. 5 is a plan view of a seismic vessel towing a plurality of source arrays, according to an embodiment of the present invention.

Depending on the specific seismic survey application, the acoustic source array system 22 also may comprise one or more acoustic source arrays 30. In the example illustrated in FIG. 5, a plurality of acoustic source arrays 30 are employed and towed behind the surface vessel 26. By way of example, the acoustic source arrays 30 may be arranged generally in parallel and separated by a support structure 66 designed to maintain the acoustic source arrays 30 at a desired horizontal spacing with respect to each other. The support structure 66 may have a variety of forms, including a rigid bar or other structure connected to the forward ends of the acoustic source arrays 30.

The examples discussed above are just a few of the possible acoustic source array system 22 configurations that benefit from the incorporation of bridles for controlling the tow point location as discussed above. In addition to variation in the number and arrangement of acoustic sources, the system may utilize a variety of floats and float layers. Many types of connection lines also can be used to connect acoustic sources with each other and with the float. The lower layer of acoustic sources may be suspended from other acoustic sources and/or the float layer. Additionally, the vertical distance between acoustic source layers as well as the horizontal distance between acoustic sources may be different from one seismic survey application to another.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A system used to produce acoustic pulses for a marine seismic survey, comprising:
   an acoustic source array system having:
      a float;
      a first layer of acoustic sources suspended below the float;
      a second layer of acoustic sources suspended below the first layer; and
      a bridle having a first bridle line and a second bridle line together at a tow connection end, the first bridle line extending from the tow connection end to the first layer and the second bridle line extending from the tow connection end to the second layer, wherein the lengths of the first bridle line and the second bridle line are selected such that pulling the source array by the tow connection end forces the tow connection end to a vertical level below the vertical level of the first layer and above the vertical level of the second layer.

2. The system as s recited in claim 1, wherein the bridle comprises a third bridle line connected between the tow connection end and the float.

3. The system as recited in claim 1, wherein the first layer comprises a plurality of air guns.

4. The system as recited in claim 3, wherein the second layer comprises a plurality of air guns.

5. The system as recited in claim 4, wherein the plurality of air guns comprises a plurality of single guns.

6. The system as recited in claim 4, wherein the plurality of air guns comprises a plurality of gun clusters.

7. The system as recited in claim 1, wherein the first layer is suspended from the float by generally upright lines coupled between the float and the acoustic sources of the first layer; and the second layer is suspended from the first layer by generally upright lines coupled between the acoustic sources of the first layer and the acoustic sources of the second layer.

8. The system as recited in claim 7, wherein the acoustic sources of the first layer are connected by generally horizontal lines; and the acoustic sources of the second layer are connected by generally horizontal lines.

9. A system, comprising:
a plurality of acoustic sources suspended from a float in two layers positioned at two different vertical levels;
a tow line; and
a bridle having: a first bridle line connected between an end portion of the tow line and an upper layer of the two layers; and a second bridle line connected between the end portion and a lower layer of the two layers, the bridle being arranged so that pulling on the tow line forces the end portion of the towline to a vertical level between the different vertical levels of the two layers.

10. The system as recited in claim 9, wherein the bridle further comprises a third bridle line connected between the tow line and the float.

11. The system as recited in claim 9, wherein the upper layer comprises a plurality of aligned acoustic sources connected by flexible lines.

12. The system as recited in claim 9, wherein the lower layer comprises a plurality of aligned acoustic sources connected by flexible lines.

13. The system as recited in claim 9, wherein the plurality of acoustic sources comprises a plurality of air guns.

14. The system as recited in claim 13, wherein the plurality of air guns comprises air gun clusters.

15. A method, comprising:
suspending a plurality of acoustic sources from a float in a plurality of layers that are vertically separated to form an acoustic source array;
coupling a bridle to the plurality of layers; and
connecting a towline to the bridle at a location that will retain a desired shape of the acoustic source array when towed.

16. The method as recited in claim 15, further comprising towing the acoustic source array; and conducting a marine seismic survey.

17. The method as recited in claim 15, wherein coupling comprises connecting a bridle line between each layer of the plurality of layers and a common tow point.

18. The method as recited in claim 17, wherein coupling comprises selecting the lengths of the bridle lines such that the common tow point is at a vertical level between the vertical levels of an upper layer and a next adjacent lower layer when the acoustic source array is towed.

19. A method, comprising:
constructing an acoustic source array with a float layer, a first acoustic source layer suspended from the float layer at a vertical distance D1 below the float layer, and a second acoustic source layer suspended below the first acoustic source layer at a vertical distance D2 below the first acoustic source layer, wherein D1 and D2 are non-zero values;
coupling bridle lines to the first acoustic source layer and the second acoustic source layer; and
joining opposite ends of the bridle lines at a tow point horizontally disposed from the first and second acoustic source layers and vertically positioned a distance E1 below the level of the first acoustic source layer and a distance E2 above the level of the second source layer, wherein E1 and E2 are non-zero values that sum to equal D2.

20. The method as recited in claim 19, further comprising coupling an additional bridle line between the tow point and the float layer.

21. The method as recited in claim 19, wherein constructing comprises suspending the second acoustic source layer directly from the first acoustic source layer.

22. The method as recited in claim 19, further comprising connecting a tow line to the bridle lines at the tow point.

23. The method as recited in claim 19, further comprising towing a plurality of the acoustic source arrays arranged generally in parallel.

* * * * *